(12) United States Patent
Beaudry

(10) Patent No.: US 6,464,815 B1
(45) Date of Patent: Oct. 15, 2002

(54) METHOD OF MANUFACTURING LAMINATED PAD

(76) Inventor: Wallace J. Beaudry, N9930 County Hwy. H, Elkhart Lake, WI (US) 53020

( * ) Notice: Subject to any disclaimer, the term of this patent is extended or adjusted under 35 U.S.C. 154(b) by 0 days.

(21) Appl. No.: 09/566,171

(22) Filed: May 5, 2000

(51) Int. Cl.[7] .................................................. B31F 1/08

(52) U.S. Cl. ........................ 156/202; 156/199; 156/200; 156/201; 156/204; 156/227; 156/253; 156/269; 604/358; 604/385.01; 15/208; 15/209.1; 15/222; 15/230.12

(58) Field of Search .............................. 156/199–204, 156/226–227, 250, 253, 269; 604/358–402; 15/208, 209.1, 210.1, 210.5, 222, 223, 230.12; 51/297

(56) References Cited

U.S. PATENT DOCUMENTS

| | | |
|---|---|---|
| 1,975,016 A | 1/1934 | Nassif |
| 2,156,270 A | 5/1939 | Smith |
| 2,557,141 A | 6/1951 | Rebora |
| 2,616,428 A | 11/1952 | Magee |
| 2,629,890 A | 3/1953 | Di Giovanna |
| 2,810,145 A | 10/1957 | Forrow |
| 2,841,811 A | 7/1958 | Carroll |
| 2,927,335 A | 3/1960 | Hammond |
| 2,961,677 A | 11/1960 | Zecchini |
| 2,964,772 A | 12/1960 | Crawford |
| 2,975,453 A | 3/1961 | Imhof |
| 3,074,099 A | 1/1963 | Cameron |
| 3,104,915 A | 9/1963 | Perkovich et al. |
| 3,131,410 A | 5/1964 | Anderson et al. |
| 3,412,855 A | 8/1964 | Gilchrist |
| 3,221,359 A | 12/1965 | Moroni et al. |
| 3,299,464 A | 1/1967 | O'Brien et al. |
| 3,363,625 A | 1/1968 | Jovis |
| 3,369,267 A | 2/1968 | Friedland et al. |
| RE26,385 E | 5/1968 | Gilchrist |
| 3,386,793 A | 6/1968 | Stanton |
| 3,446,208 A | 3/1969 | Fukuda |
| 3,521,624 A | 7/1970 | Gander et al. |
| 3,638,270 A | 2/1972 | Schlegel, Jr. et al. |
| 3,661,680 A | 5/1972 | Gore |
| 3,694,845 A | 10/1972 | Engelsher |
| 3,737,939 A | 6/1973 | Jones, Sr. |
| 3,775,014 A | 11/1973 | Rosborne |
| 3,784,998 A | 1/1974 | Jones, Sr. |
| 3,809,483 A | 5/1974 | Young |
| 3,843,991 A | 10/1974 | Vallis |
| 3,860,348 A | 1/1975 | Doyle |
| 3,888,248 A | 6/1975 | Moore et al. |
| 3,911,922 A | 10/1975 | Kliger |
| 3,955,233 A | 5/1976 | Nakamura |
| 3,989,867 A | 11/1976 | Sisson |
| 4,014,616 A | 3/1977 | Mast, Jr. et al. |
| 4,053,242 A | 10/1977 | Mast, Jr. |
| 4,121,386 A | 10/1978 | Perez |
| 4,140,409 A | 2/1979 | DeVries |
| 4,321,997 A | 3/1982 | Miller |
| 4,341,575 A | 7/1982 | Herz |
| 4,360,020 A | 11/1982 | Hitchcock, Jr. et al. |
| 4,372,867 A | 2/1983 | Taragos |
| 4,382,507 A | 5/1983 | Miller |
| 4,410,578 A | 10/1983 | Miller |
| 4,417,894 A | 11/1983 | Norris |
| 4,506,404 A | 3/1985 | Clay |
| 4,519,795 A | 5/1985 | Hitchcock, Jr. et al. |
| 4,519,798 A | 5/1985 | Dinius |

(List continued on next page.)

Primary Examiner—Jeff H. Aftergut
Assistant Examiner—Jessica Rossi
(74) Attorney, Agent, or Firm—Ryan Kromholz & Manion, S.C.

(57) ABSTRACT

A laminated pad and method of manufacturing such pad wherein the laminated pad includes a grip portion and a work surface. The work surface may be comprised of any of a variety of substances including absorbent material, abrasive material, or polishing material. The grip portion may be upstanding for facile gripping with one's fingers.

1 Claim, 6 Drawing Sheets

U.S. PATENT DOCUMENTS

| | | |
|---|---|---|
| 4,540,414 A | 9/1985 | Wishman |
| 4,575,891 A | 3/1986 | Valente |
| 4,617,021 A | 10/1986 | Leuprecht |
| 4,701,168 A | 10/1987 | Gammons |
| 4,704,107 A | 11/1987 | Coates |
| 4,773,408 A | 9/1988 | Cilento et al. |
| 4,780,352 A | 10/1988 | Palumbo |
| 4,798,603 A | 1/1989 | Meyer et al. |
| 4,813,944 A | 3/1989 | Haney et al. |
| 4,829,995 A | 5/1989 | Metters |
| 4,893,956 A | 1/1990 | Wojcik et al. |
| 4,925,453 A | 5/1990 | Kannankeril |
| 5,055,332 A | 10/1991 | Rhodes et al. |
| 5,110,386 A * | 5/1992 | Ochi et al. .................. 156/204 |
| 5,211,641 A | 5/1993 | Roos et al. |
| 5,230,119 A | 7/1993 | Woods et al. |
| 5,263,949 A * | 11/1993 | Karami et al. .............. 604/358 |
| 5,317,761 A | 6/1994 | Piche et al. |
| 5,507,906 A | 4/1996 | Woods et al. |
| 5,771,524 A | 6/1998 | Woods et al. |
| RE36,601 E | 3/2000 | Woods et al. |
| 6,044,515 A | 4/2000 | Zygmont |

* cited by examiner

METHOD OF MANUFACTURING LAMINATED PAD

BACKGROUND OF THE INVENTION

The present invention is drawn to a laminated pad and method of manufacturing such articles. More specifically, the present invention is a laminated pad having a work surface and a grip portion. The work surface may be varied, depending upon the desired application, to include absorbent, abrasive or polishing components.

The present invention provides a unique and convenient laminated pad that may include a pre-selected work surface that is able to perform a variety of tasks. For example, present absorbent articles, such as cotton balls, are used for a wide range of applications such as make-up removal, finger nail polish removal, or product application. However, when absorbent articles of this type are used, often the product being used or applied may seep through the absorbent article and come in contact with the fingers of the user, thereby creating mess or contact with the product. Furthermore, it may be difficult to maintain grip on a moistened absorbent article. In the preferred embodiment, the present invention is provided with an absorbent work surface, wherein the usual problems associated with typical cotton type pads are alleviated.

Alternately, the laminated pad of the present invention may be provided with an abrasive work surface. Usual abrading devices, for example for sanding tiny, hard to reach spaces, require power sanders of reduced size or inconvenient wadding of abrasive material, while the present device, supplied with an abrasive work surface, allows facile use while abading hard-to-reach surfaces. A further embodiment of the laminated pad includes a polishing work surface to be used for polishing difficult areas or in any application that the user requires an inexpensive, disposable polishing pad.

In the preferred embodiment of the invention the laminated pad includes an absorbent work surface, and a finger grip area including a barrier portion. The finger grip area is located opposite the work surface and includes a barrier portion for preventing moisture from the work surface from reaching the fingers of the user. The method of manufacturing and apparatus utilizing the method are also presented. The method and apparatus are capable of quickly and accurately producing the novel article in a number of sizes and shapes.

SUMMARY OF THE INVENTION

The present invention resides in a laminated article and method and apparatus for the manufacture of the article. The article includes a first layer having a work surface, with the first layer adhesively bonded to a moisture resistant gripping and barrier portion. The work surface may be of a variety of materials, including but not restricted to, absorbent, abrasive or polishing materials.

The novel method of manufacture may be used in connection with a novel arrangement of machine components. The steps of the method of manufacture include: providing a continuous web of material having a work surface and an oppositely adjacent supporting surface material; folding the first web of adhesive-backed material along two predetermined folding areas located longitudinally coextensive the material length to form two longitudinally coextensive folded edges, wherein each of the exposed surfaces are preferably adhesively coated; providing a second continuous web of adhesive-backed material; overlaying and coupling the second adhesive-backed material to a first side of the first, folded adhesive-backed material length; coupling the supporting surface of said continuous web of work surface material to a second side of the first, folded adhesive-backed material length to form a layered web; and die cutting the layered web into a predetermined configuration. Optionally, a continuous strip of carrier material for supporting the web of material having a work surface may be provided.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention is directed to a method, apparatus, and a structure resulting from the method and apparatus. The present invention generally relates to laminated pads 10, and more particularly, to laminated pads 10 having a variety of work surfaces 14. The method of the present invention, while unique and fully described herein, may be used on novel machine components and cooperating arrangements thereof.

The advantages of the present invention are believed not to be apparent from the known pads and work surfaces of the prior art. As seen in FIGS. 1a–4, the laminated pad 10 of the present invention typically includes a first layer 12 having a work surface 14 and a support surface 16, and a second layer 18 adhesively attached to the support surface 16 of the first layer. As seen particularly in FIGS. 1a and 3, the second layer 18 is comprised of two adjacent portions 20a and 20b, which are each divided into a supporting area 22 folded at 24, and an upstanding area 26. The upstanding area 26 of each adjacent portion 20a, 20b is adhesively coupled to the other upstanding area 26 to provide a gripping portion 28.

Figure 3:
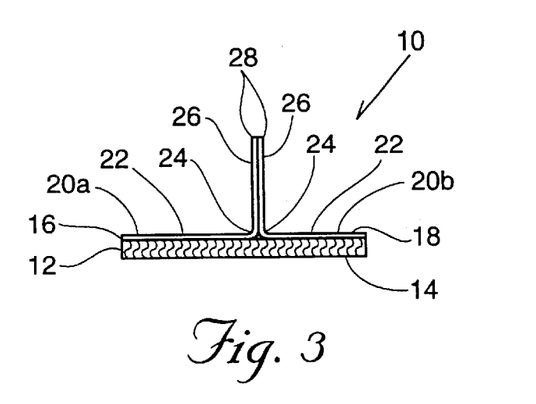
FIG. 3 is a side elevational view of the laminated pad of FIG. 1.
Figure 4:
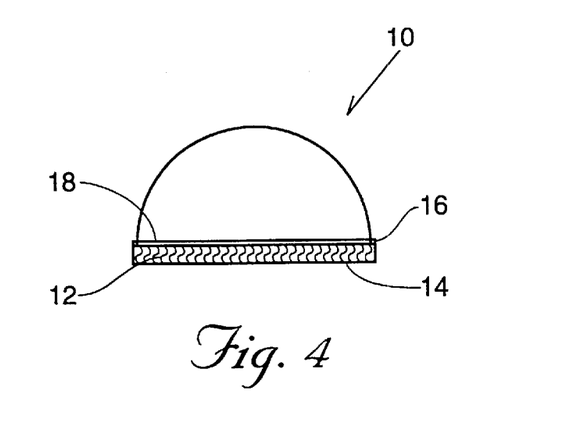
FIG. 4 is a side elevational view of the laminated pad shown in FIG. 3, but with the pad rotated 90 degrees from the view of FIG. 3.

Referring to FIG. 3, an elevational edge view of the laminated pad 10, including the gripping portion 28, may be seen. It may be noted that in the preferred embodiment the gripping portion 28 may be slightly offset from center to provide a larger supporting area 22 on one half of the pad 10 to accommodate more facile gripping of the pad 10.

Referring to FIGS. 1a–d and 3, the second layer 18 is folded, as shown at 24, to form an upstanding gripping portion 28. In the preferred embodiment the second layer 18 may be bipartite and comprise two adjacent portions 20a and 20b which each respectively fold at 24 and form adjacent upstanding areas 26. Conjoined upstanding areas 26 form the gripping portion 28.

In the preferred embodiment, the work surface 14 may be fabricated from a prelaminated absorbent material including components such as Delnet AC530NA facing material and Rayon substrate, as in the case of a makeup removal pad. Another embodiment of the laminated pad 10 may include a work surface 14 having a polishing characteristic. A further embodiment of the laminated pad 10 may include a work surface 14 made of an abrasive material, for example, an abrasive surface such as sandpaper or a material similar to "steel wool". Alternately, the work surface 14 may comprise a lint-free material such as a sponge.

The second layer 18 is preferably formed of sheet polypropylene, acetate or any other flexible material capable of retaining an adhesive coating on at least one side. Currently it is preferred to use an adhesive-coated polyester. Products suitable for this application may be commercially obtained from any pressure sensitive tape manufacture, such as for example, 3-M Corporation. The adhesive coating is preferably pre-applied although it is within the province of this invention to use an uncoated web material that may be adhesively coated in situ during manufacture.

Figure 1A:
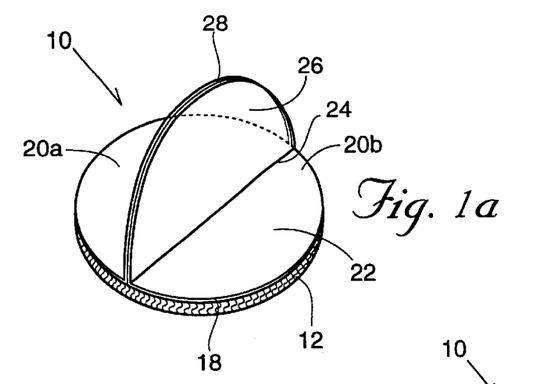
FIG. 1a is a perspective view of the preferred embodiment laminated pad made according to the present invention.
Figure 1B:
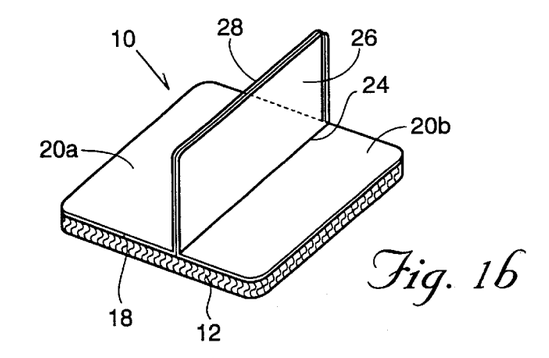
FIG. 1b is a perspective view of an alternate embodiment laminated pad showing a square configuration.
Figure 1C:
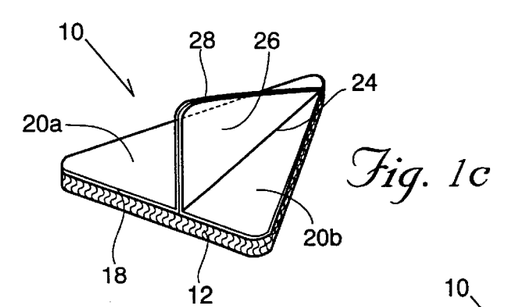
FIG. 1c is a perspective view of another alternate embodiment laminated pad and showing a triangular configuration.
Figure 1D:
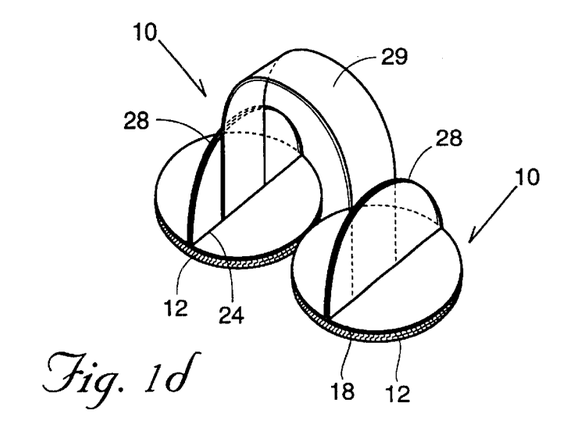
FIG. 1d is a perspective view showing a plurality of linked together laminated pads.
Figure 2:
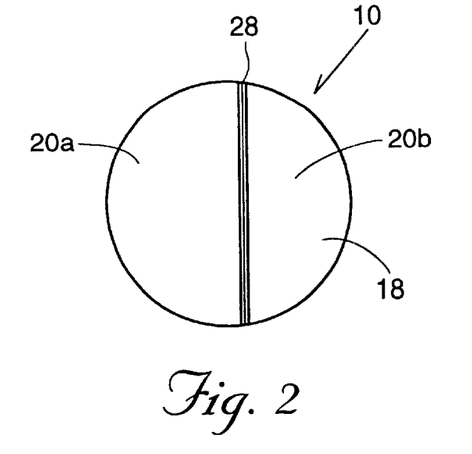
FIG. 2 is a top plan view of the laminated pad shown in FIG. 1.

It is to be understood that the laminated pad 10 of the present invention may be cut into any size or shape as illustrated in FIGS. 1a, 1b and 1c by way of example. A varied pad 10 shape allows use in diverse application environments when, as an example, a corner shape such as that shown in FIG. 1c, may aid the user in reaching a similarly configured work site. Further, it is within the scope of this invention to couple a plurality of pads 10 together with a connecting band 29, as shown in FIG. 1d.

Figure 5:
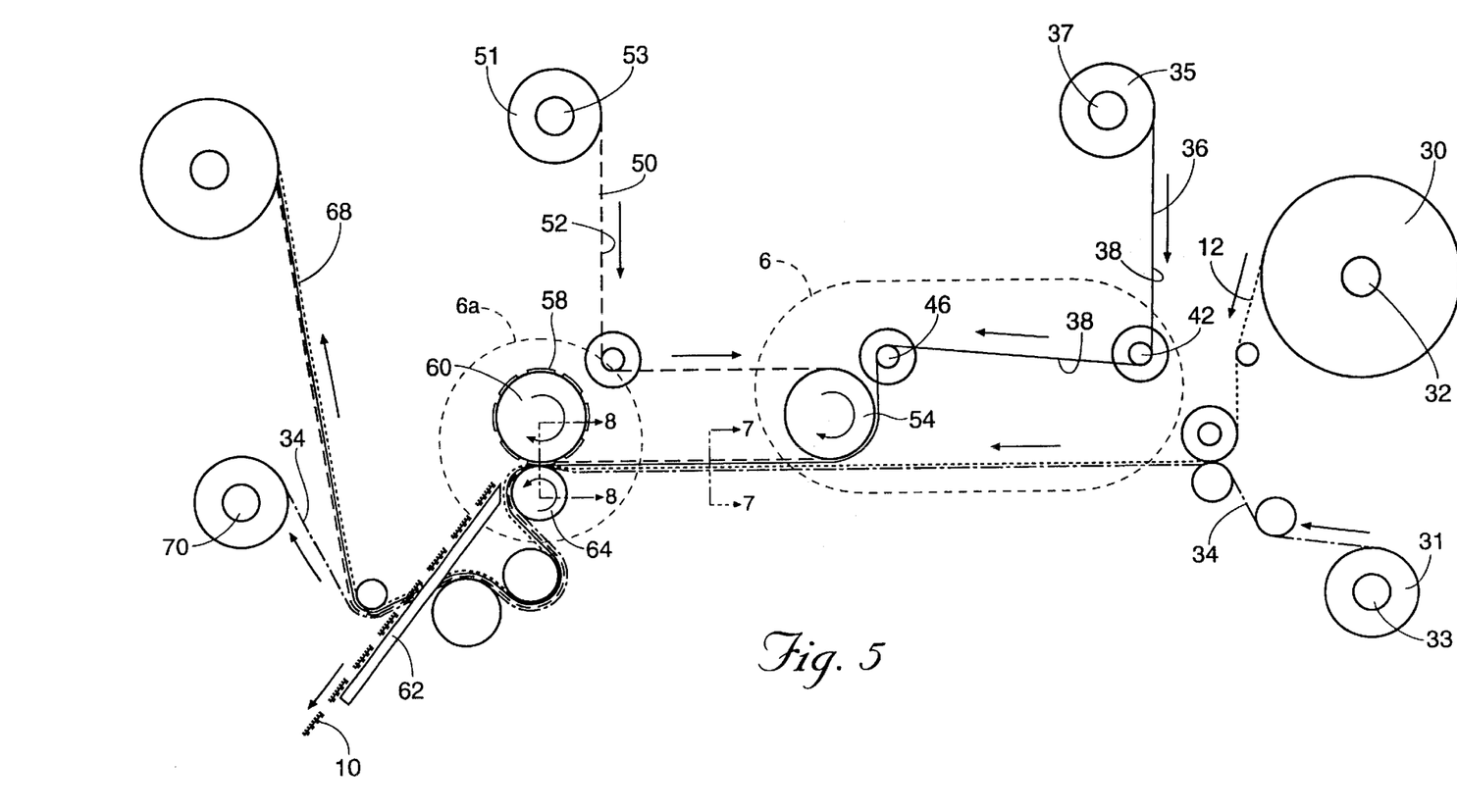
FIG. 5 is a schematic diagram showing the components of the present invention being fed into a machine suitable to perform the process and make at least one of the products disclosed herein.

One possible method for achieving the structure of FIGS. 1a–4 is the use of a novel machine and method in which the first and second layers are assembled and cut into a desired configuration. (See the schematic view of FIG. 5 for a general illustration of the relationship of the components of the machine). In particular, referring to FIGS. 5, 6, and 6a, the method by which the laminated pad 10 is manufactured is shown. This method includes feeding the first layer 12 from a roll 30 supported by a journal 32 over a predetermined number of rollers and toward the cutting structure 60. A supporting carrier strip 34 is fed from a roll 31 supported by a journal 33 and over a predetermined number of rollers and passes colinearally and underlying the first layer 12. A first continuous web 36 of material to be used in forming the second layer 18 is fed from a roll 35 supported by a journal 37 and over a predetermined number of rollers toward a folding apparatus 40. The first web 36 is preferably adhesively coated on one side 38. The folding apparatus 40, seen particularly in FIG. 6, turns the sides of the first web 36 upwardly and onto itself to form two longitudinally coextensive folded edges 41.

Figure 6:
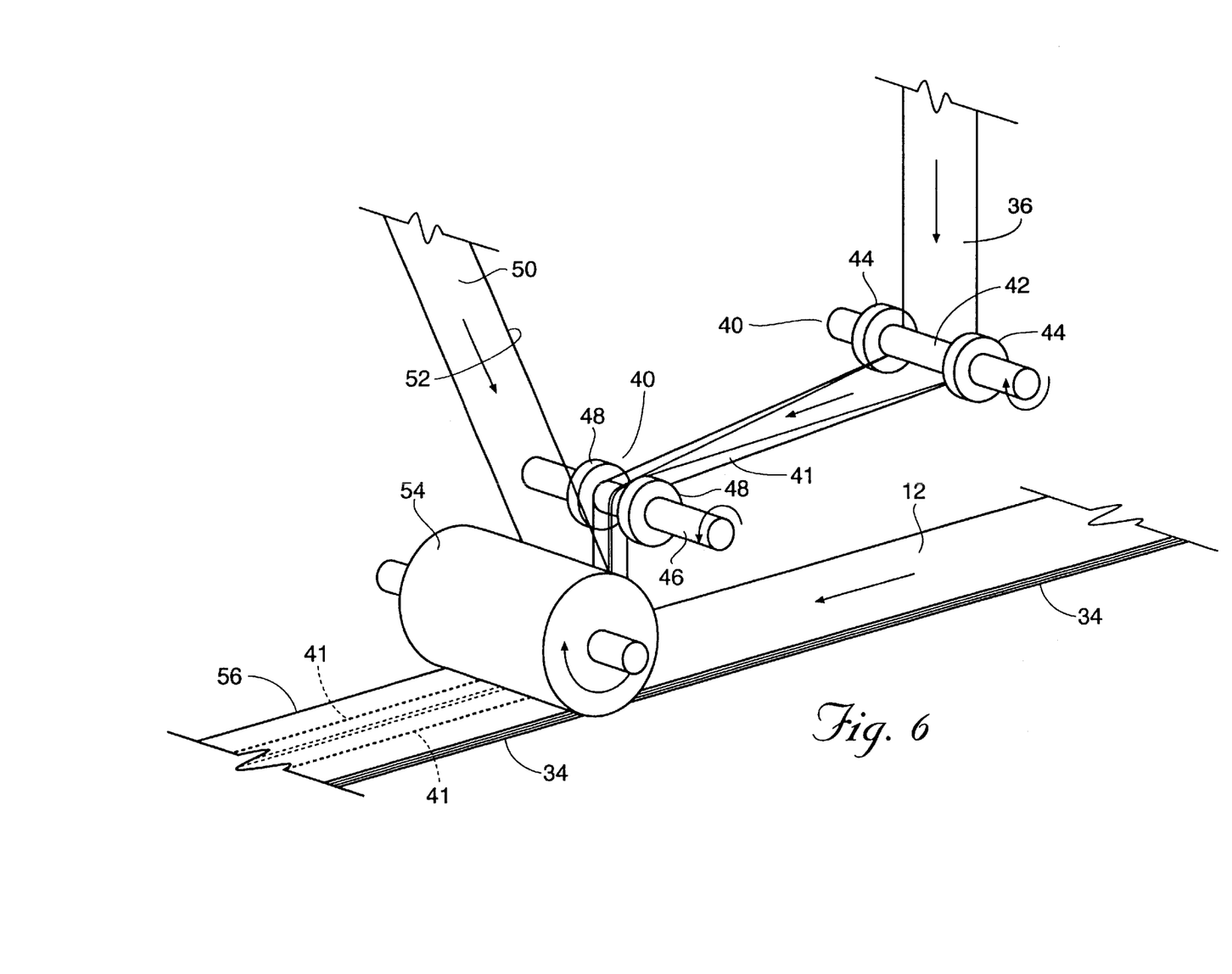
FIG. 6 is a perspective view showing the general relationship of the components for making the various embodiments disclosed herein and taken from the area designated generally by the numeral 6 in the view of FIG. 5.

Seen particularly in FIG. 6, the folding apparatus 40 preferably comprises a first rotatable drive shaft 42 having two spacers 44 preset to approximate the width of the incoming first web 36, and a second rotatable drive shaft 46. The second rotatable drive shaft 46 includes a pair of spacers 48 preset to force the edges of the web 36 upwardly and over itself to form a pair of folded edges 41.

Again with reference to FIG. 6, it can be seen that a second continuous web 50 is fed from a roll 51 supported by a journal 53 and over a predetermined number of rollers toward the folded first web 36. The second continuous web 50 is preferably adhesively coated on one side 52. As the second web 50 meets the folded first web 36, an anvil roller 54 presses the adhesive sides towards one another to conjoin the first, folded web 36 and the second web 50 together to form the second layer 18. The anvil roller 54 further presses the formed second layer 18 to the first layer 12. The first layer 12, riding on the supporting carrier strip 34, is composed of a work surface 14 and a support surface 16. The second layer 18, formed from the first, folded web 36 and the second web 50, is pressed to the support surface 16 of the first layer 12 with the work surface 14 of the first layer 12 facing the carrier strip 34.

Figure 6A:
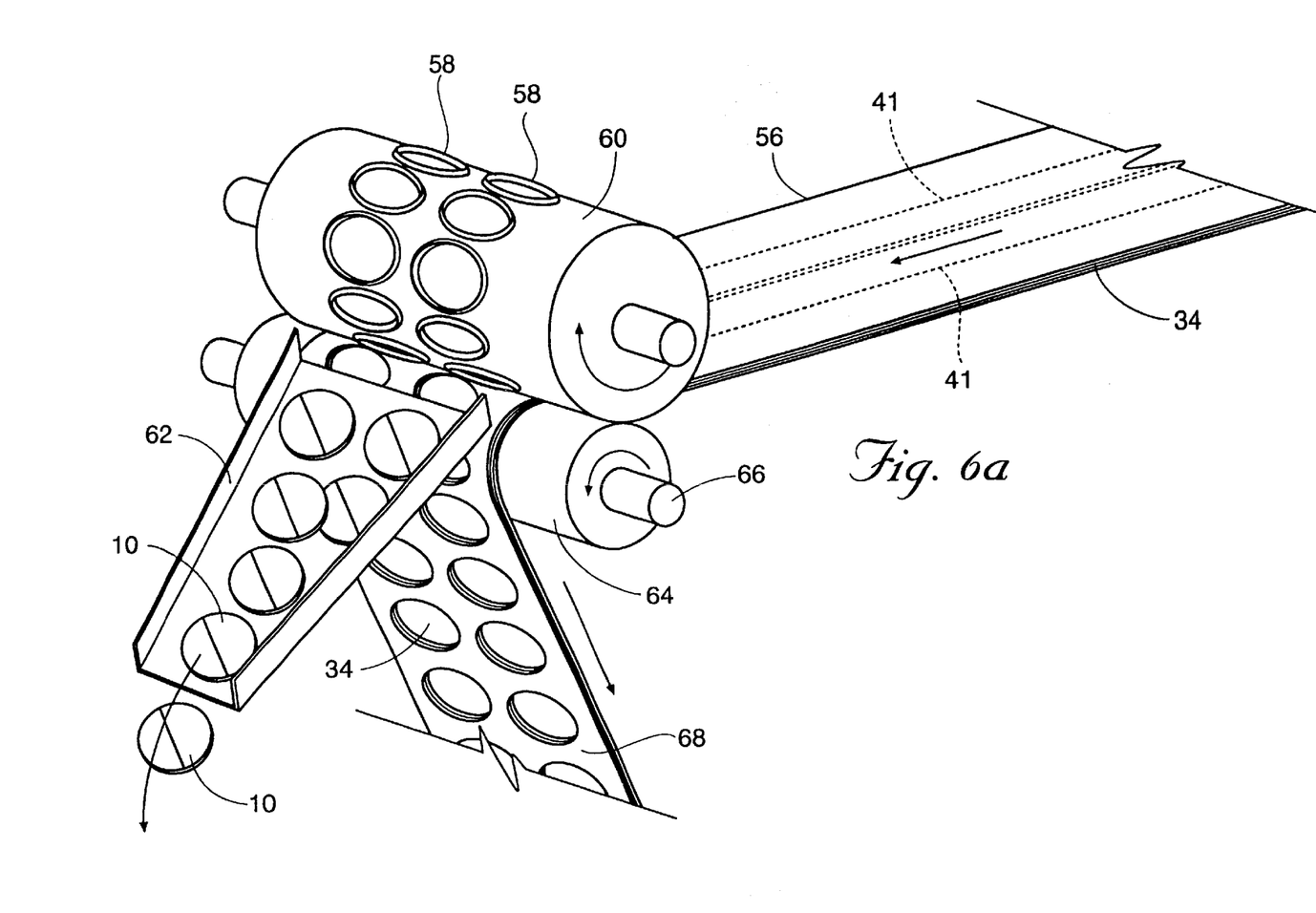
FIG. 6a is a perspective view showing the general relationship of the components for making the various embodiments disclosed herein and taken from the area designated generally by the numeral 6a in the view of FIG. 5.
Figure 7:
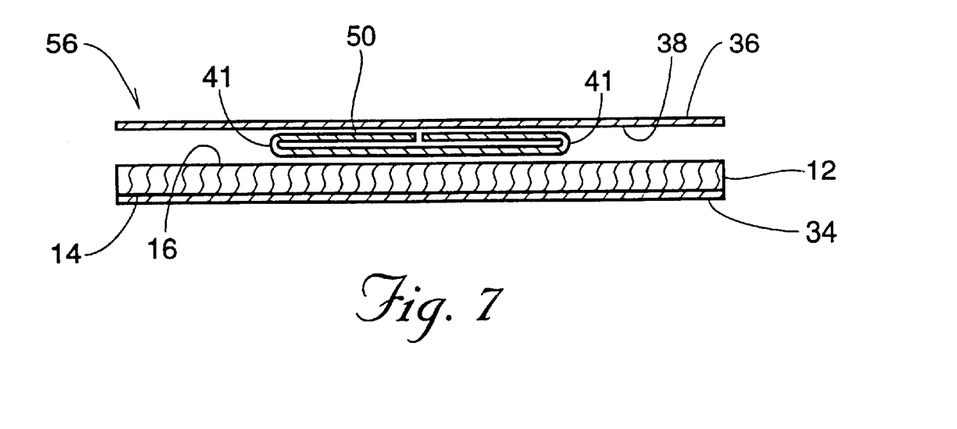
FIG. 7 is a cross sectional view of the various layers comprising the laminated pad, but prior to cutting, and taken along lines 7—7 of FIG. 5.
Figure 8:
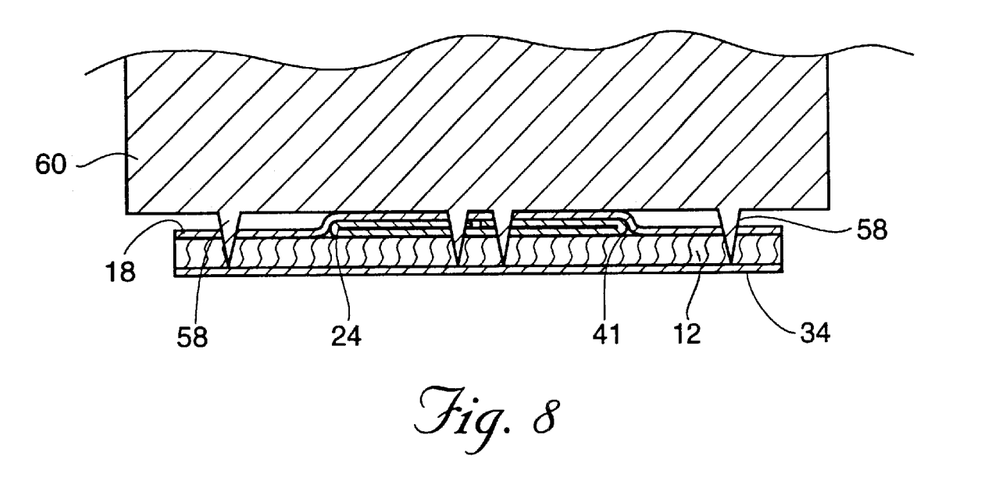
FIG. 8 is a cross sectional view of a section of the cutting tool and various layers comprising the laminated pad and taken along lines 8—8 of FIG. 5.

Referring now to FIG. 6a, it will be observed that the composite article 56 (seen in cross section in FIG. 7) comprising the conjoined first layer 12 and second layer 18 is fed toward a die cutting tool 60. As seen in FIG. 8, the die cutting tool 60 severs the layers 12 and 18 with each folded edge 41 approximately located at the center of the preconceived shape. The cut may be located slightly off center to provide a larger protective barrier or support area 22 on one side. The die cutting tool 60 preferably includes a plurality of pre-configured cutting knives 58, shown here as circular. With further reference to FIG. 6a it is seen that the cut laminated pads 10 are fed from the cutting tool 60 to a chute 62, and thereafter packaged.

Anvil roll 64, supported by rotating shaft 66 acts to pull the scrap material 68 from the cutting area for disposal. As shown in FIGS. 6a and 8, the carrier strip 34 is not pierced, but after cutting of the pads 10, is separated from the scrap material 68 on a roll 70 (seen in FIG. 5) to be cleaned and reused. While it is preferred that the method includes use of a carrier strip 34 as stated above, it is to be understood that the present method may be practiced without the carrier strip as well.

It will be apparent that the described invention provides a laminated pad 10 that includes a work surface 14 which may be abrasive, absorbent or otherwise and further includes a second layer 18 having supporting areas 22 which provide a convenient barrier means to protect a user of the pad 10 from unwanted contact with any products used with the pad 10.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. The method of making a laminated pad comprising a first layer having an exposed work surface, a second layer overlaying and secured to said first layer, said second layer including an intermediate manual gripping area, said second layer comprising two adjacent portions, each portion being folded to provide adjacent area, a first area of a first portion being adhesively attached to a first area of a second portion to provide said manual gripping area, a second area of said first portion and a second area of said second portion being adhesively attached to an opposite, unexposed surface of said first layer, the method comprising the steps of:

providing a continuous web of material, said material providing said work surface of said laminated pad and said unexposed surface;

providing a continuous strip of carrier material for supporting said continuous web;

providing a first continuous web of adhesive-backed material;

folding said first web of adhesive backed material along two predetermined folding areas located longitudinally coextensive of a length of said material to form said manual gripping area, wherein all exposed edges are adhesively coated;

providing a second continuous web of adhesive-backed material;

overlaying and coupling said second adhesive-backed material to a first side of said first, folded adhesive-backed material length;

coupling the supporting surface of said continuous web having said work surface to a second side of first, folded adhesive-backed material length to form said laminated pad;

die cutting said laminated pad into a predetermined pad configuration.

* * * * *

UNITED STATES PATENT AND TRADEMARK OFFICE
CERTIFICATE OF CORRECTION

PATENT NO. : 6,464,815 B1
DATED : October 15, 2002
INVENTOR(S) : Wallace J. Beaudry

It is certified that error appears in the above-identified patent and that said Letters Patent is hereby corrected as shown below:

<u>Title page,</u>
Item [56], References Cited, OTHER PUBLICATIONS, insert
-- Removal tab with gripping flap found on: 'Austin Powers Shagadelic Shakers' made by Mott's, Inc. date unknown --; and insert -- Removal tab with gripping flap found on French's mustard dispenser, date unknown --.

<u>Column 5,</u>
Line 6, delete "area" and substitute -- areas --.

Signed and Sealed this

Eleventh Day of May, 2004

JON W. DUDAS
*Acting Director of the United States Patent and Trademark Office*